United States Patent [19]

Nguyen et al.

[11] Patent Number: 5,185,876

[45] Date of Patent: Feb. 9, 1993

[54] BUFFERING SYSTEM FOR DYNAMICALLY PROVIDING DATA TO MULTIPLE STORAGE ELEMENTS

[75] Inventors: Anh Nguyen, Sunnyvale; Kumar Gajjar, San Jose, both of Calif.

[73] Assignee: Micro Technology, Inc., Sunnyvale, Calif.

[21] Appl. No.: 494,039

[22] Filed: Mar. 14, 1990

[51] Int. Cl.⁵ .................................. G06F 12/00
[52] U.S. Cl. ........................... 395/425; 364/240.3; 364/DIG. 1; 364/935.47; 364/DIG. 2
[58] Field of Search ............... 364/200, 900, DIG.1, 364/240.3, DIG. 2, 935.47; 395/425

[56] References Cited

U.S. PATENT DOCUMENTS

| | | | |
|---|---|---|---|
| 4,070,704 | 1/1978 | Calle et al. | 364/200 |
| 4,207,609 | 6/1980 | Luiz et al. | 364/200 |
| 4,342,079 | 7/1982 | Stewart et al. | 364/200 |
| 4,371,928 | 2/1983 | Barlow et al. | 364/200 |
| 4,607,348 | 8/1986 | Sheth | 364/900 |
| 4,644,463 | 2/1987 | Hotchkin et al. | 364/200 |
| 4,672,613 | 6/1987 | Foxworthy et al. | 364/200 X |
| 4,814,982 | 3/1989 | Weir | 364/200 |
| 4,860,244 | 8/1989 | Bruckert et al. | 364/900 |

*Primary Examiner*—Michael R. Fleming
*Assistant Examiner*—Glenn A. Auve
*Attorney, Agent, or Firm*—Townsend and Townsend

[57] ABSTRACT

A data storage system having a local processor and a plurality of memory storage elements is used for storing data from one or more external CPUs. The storage system includes a plurality of memory buffers, each coupled to a separate memory storage element. A data path control circuit is programmed by the local processor to control the transfer of data between the external CPUs and the memory buffers. Two interface circuits are coupled between the external CPUs and the memory buffers to provide two data paths for transferring data between the external CPUs and the memory buffers. The data path control circuit contains two independent sequencing circuits for selecting memory buffers. This allows one data path to be used for reading or writing to a number of the memory buffers while the other data path is simultaneously used for a different operation for the rest of the memory buffers.

31 Claims, 6 Drawing Sheets

— ACTIVE
--- INACTIVE

BUFFERING SYSTEM FOR DYNAMICALLY PROVIDING DATA TO MULTIPLE STORAGE ELEMENTS

BACKGROUND OF THE INVENTION

The present invention relates generally to a system for reading and writing data to an array of memory storage devices.

In a data processing system the performance of the central processing units (CPUs) is often limited by their data-storage subsystems. In particular, secondary storage devices used in such subsystems often are incapable of transferring data at a rate that matches the speed with which the CPUs and the system buses are capable of handling the data. To improve the data transfer rate of the data-storage subsystems, and to enhance the overall data throughput of data processing systems, a storage subsystem architecture can be used in which the data is stored in an array of multiple storage devices.

Such a storage array architecture can be implemented by coupling a high-speed data path (e.g., an input/output bus of a CPU) to an array of slower storage devices (e.g., tape or disk drives) via a corresponding array of high-speed memory elements. To write data to the storage devices, the provided data segments are transferred at high speed one after another over the data path to different ones of the memory elements of the memory element array, which in turn hold the data segments until the corresponding storage devices are ready to receive the data. The segments of data can then be transferred in parallel to the storage devices, such that the entire data may be stored in the storage device array in a shorter time, and with less sacrifice of CPU and system bus cycles, than would be required by a single storage device. The throughput of the high-speed data path is thus enhanced. The stored data can likewise be read from the storage devices at a high speed by transferring segments of data to corresponding memory elements, which in turn transfer one segment after another over the high-speed data path at a rapid rate.

Generally, the known method for directing data into and out of a series of memory elements is to use a state machine sequencer implemented in hardware logic to control a memory element access sequence. This method has several drawbacks. For example, the configuration in which data segments are stored in an array may vary from data transfer to data transfer, thus making it necessary that the sequence in which the data segments are transferred between the data path interface and the storage device array be variable. A state machine sequencer typically lacks sufficient flexibility to accommodate many different data storage configurations, and may require expensive modification to accommodate even a slight change in configuration. This may limit the usefulness of the entire secondary storage subsystem. Known state machine sequencers also are typically complex and expensive. Thus there is a need for a process for selecting memory elements that can be varied to accommodate a wide variety of data storage configurations and that can be implemented in a simple and inexpensive manner.

SUMMARY OF THE INVENTION

According to the invention, a data storage system having a local processor and a plurality of memory storage elements is used for storing data from one or more external CPUs. The storage system includes a plurality of memory buffers, each coupled to a separate memory storage element. A data path control circuit is programmed by the local processor to control the transfer of data between the external CPUs and the memory buffers. Two interface circuits are coupled between the external CPUs and the memory buffers to provide two data paths for transferring data between the external CPUs and the memory buffers. The data path control circuit contains two independent sequencing circuits for selecting memory buffers. This allows one data path to be used for reading or writing to a number of the memory buffers while the other data path is simultaneously used for a different operation for the rest of the memory buffers.

The use of two interface circuits and the data path control circuit allows the system to write into some of the memory buffers and read from other memory buffers simultaneously over the two data paths; or one interface circuit can be used to read or write while the other is inactive, and vice-versa; or one interface circuit can be used to read while the other interface circuit is used to write, and vice-versa. A dedicated logic circuit allows only one interface circuit to communicate with a specific memory buffer at any given time. So, while one interface circuit is communicating to a specific memory buffer, the other interface circuit can communicate with any of the remaining memory buffers. The local processor and the data path control circuit allow the data transferred between the external CPUs and the memory storage system to be stored or retrieved in a predetermined selective sequence.

Each memory buffer has a temporary memory (typically, a static ram) for temporarily storing data transferred to or from the memory storage element (typically, a disk drive). Data paths couple the data I/O of the static RAM (SRAM) to the first and second interface circuits and to the disk drive through a word assembler. The word assembler converts between the 36-bit SRAM I/O path and the 9-bit disk drive I/O path. The particular data path to be used is controlled by transceivers which are enabled by read/write and I/O circuitry under control of the local processor. Two separate counters are used to sequence through the addresses provided to the SRAM to transfer data between (1) the SRAM and the interface circuits, and (2) the SRAM and the disk drive interface, respectively. These counters can be preprogrammed by the local processor, which then selects the appropriate one to sequence through addresses, depending on the type of data transfer.

A multi-function capability of each memory buffer allows it to transfer the same data to different memory buffers. This means the data can be duplicated in multiple copies that can later be sent to different destinations.

The invention will be better understood by reference to the following detailed description in connection with the accompanying drawings.

DETAILED DESCRIPTION OF THE PREFERRED EMBODIMENTS OF THE INVENTION

Figure 1:
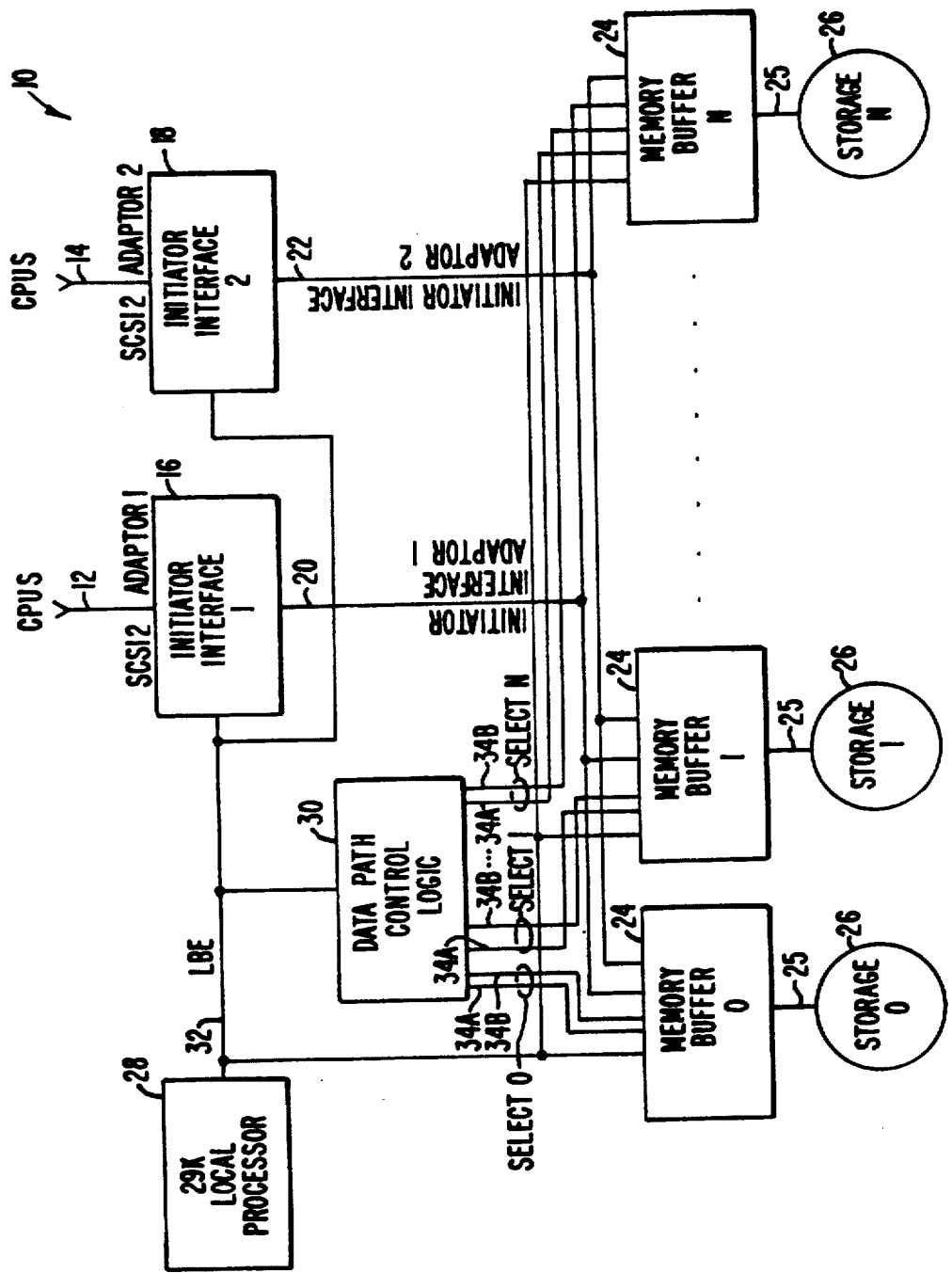
FIG. 1 is a an overall block diagram of the data storage system of the present invention.

FIG. 1 shows an overall block diagram of a data storage system 10. System 10 includes high-speed SCSI-2 buses 12 and 14 which are connected to an external computer system (not shown). SCSI-2 buses 12 and 14 provide data to first and second interface circuits 16 and 18, respectively. Interface circuit 16 provides data to a plurality of memory buffers 24 across a data bus 20. Likewise, interface circuit 18 provides data to memory buffers 24 across a data bus 22. Each memory buffer 24 further provides data to a separate memory storage unit 26 across a 9-bit data bus 25. A local processor 28 coupled to interface circuits 16 and 18 through a local bus extension 32 provides address and control signals to memory buffers 24 and a control logic circuit 30. Control logic 30 is connected to each memory buffer 24 by a plurality of select lines 34A and 34B. Preferably, each SCSI-2 bus 12 and 14, data bus 20 and 22 and local bus extension 32 are 36 bits wide.

In an overview, data can be written into and read from storage elements 26 by the external computer system. For writing operations, data enters on SCSI-2 bus 12 (or 14) from the external computer system and is forwarded by interface circuit 16 (or 18) along data bus 20 (or 22) to a selected memory buffer 24. From the selected memory buffer 24, the data is written into storage unit 26 through data bus 25. For reading operations, data is retrieved from storage unit 26 through memory buffer 24 along data bus 20 (or 22) to the appropriate interface circuit 16 or 18.

Interface circuits 16 and 18 can operate simultaneously; or, one could operate while the other is inactive. Data can be written into selected storage elements 26 on data bus 20 while data is read from other selected storage units 26 along data bus 22 and vice versa. Also, interface circuits 16 and 18 can both write simultaneously, or read simultaneously, to greatly increase the data transfer rate. Control logic 30 selects one or more of memory buffers 24 and enables their I/O to one of data buses 20 and 22 through two select lines 34A and 34B. Select line 34A corresponds to data bus 20 and select line 34B corresponds to data bus 22.

When data is written into a memory buffer 24 for later transfer to a storage unit 26, an address for the memory buffer is provided from local processor 28. Control logic 30 is programmed by processor 28 to select a particular select line 34A (or 34B) to address a desired memory buffer 24 for storing the data. The data is subsequently transferred to a storage unit 26.

A read operation is similar to a write operation. An address is provided from local processor 28 along bus extension 32 to a selected memory buffer 24, for accessing the memory in the selected memory buffer. The data will have previously been transferred from storage unit 26 to memory buffer 24. Once the desired address location is selected, the data is retrieved along data bus line 20 or 22, through the respective initiator interface circuit 16 or 18, then continuing along SCSI-2 bus 12 or 14 to the external computer system. Local processor 28 selects which interface circuit 16 or 18 (or both) is to be used for data transfer to a memory buffer.

Figure 2:
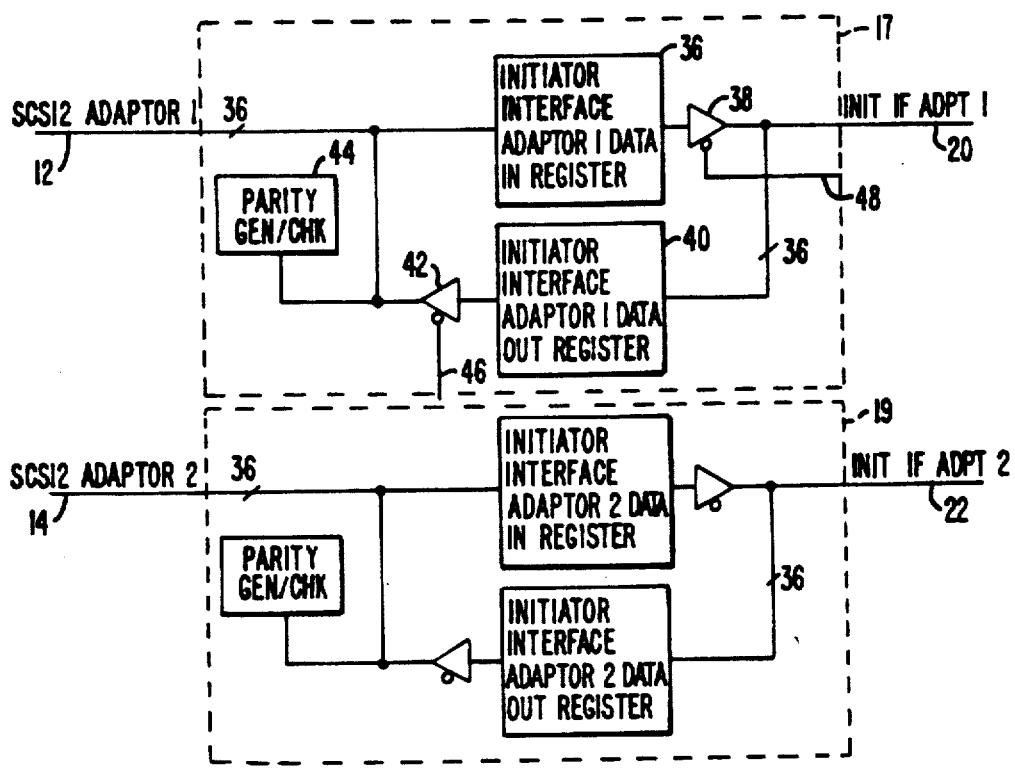
FIG. 2 is a block diagram of the interface circuits of FIG. 1.

FIG. 2 shows in block diagram form interface circuits 17 and 19 as connected to computer interface SCSI-2 buses 12 and 14. Preferably, interface ports 12 and 14 are small computer system interfaces (SCSI). As shown and described earlier, SCSI-2 buses 12 and 14 are 36-bit data buses. Data to be stored in storage units 26 is provided along SCSI-2 bus 12 and stored in a data-in register 36. A driver 38 is connected between the output of data-in register 36 and data bus 20. Data-out register 40 receives data retrieved from storage units 26 along data bus 20 and is coupled to SCSI-2 bus 12 through driver 42. The parity of each data word is checked by parity circuit 44, which is coupled to SCSI-2 bus 12. Both driver 38 and driver 42 are connected to control lines 48 and 46, respectively.

In a write operation, driver 38 is enabled by a signal on control line 48 while driver 42 is disabled by a signal on control line 46 when data is being written into any of the storage units 26. Driver 42 is disabled to block any data coming from data-out register 40 so the data does not interfere with the data coming in on data bus 12 through data-in register 36. In a read operation, the opposite operation occurs. Driver 42 is enabled by a signal on control line 46 while driver 38 is disabled by a signal on line 48 when data is being read from any of storage units 26. Driver 38 is disabled to allow data in data-out registers 40 received from bus 20 to be outputted to SCSI-2 bus 12. This disablement of driver 38 blocks data-in register 36 so that it does not interfere with the data-out operation of data-out register 40. Local processor 28 selects one of driver 42 and driver 38 with control signals on lines 46 and 48. The control signals are provided to interface circuit 17 from local processor 28 along bus extension 32. Interface circuit 19 is identical to circuit 16 in structure and performs the same function and operation for SCSI-2 bus 14 and data bus 22.

Figure 3:
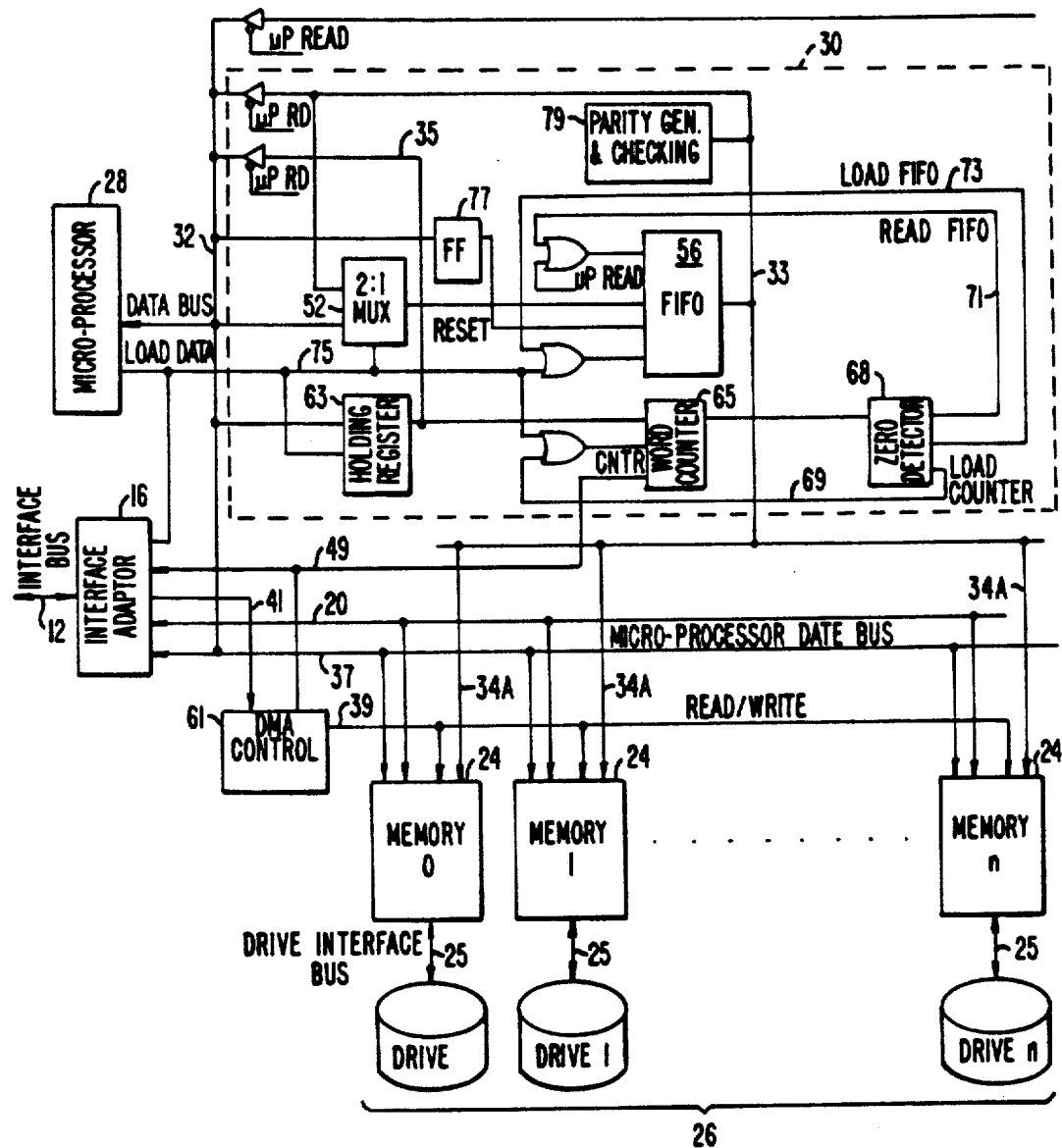
FIG. 3 is a block diagram of one embodiment of the control logic of FIG. 1.

FIG. 3 shows one implementation of the control logic 30 of FIG. 1 with only data bus 20. The portion of the data storage system shown in FIG. 3 illustrates various paths along which data can be transferred in the storage subsystem to and from a plurality of disk drive devices (0-N). Data is transferred between interface circuit 16 and memory buffers 24 over data bus 20, although data can also be transferred between local processor 28 and memory buffer 24 over bus extension 32, or from one memory buffer 24 to another over bus 20 or bus extension 32 or another bus not shown.

Interface circuit 16 is coupled to SCSI-2 bus 12 by which data is transferred between interface circuit 16 and other modules of the data storage system or the external CPU or other components of the data processing system. SCSI-2 bus 12 may, for example, couple interface circuit 16 to a front-end interface module of the data storage system. Interface circuit 16 controls the flow of data on data bus 20 which couples interface circuit 16 to a data port of each of memory buffers 24. Each memory buffer 24 in turn is coupled to a corresponding memory storage unit 26, such as a disk drive, via a data bus 25. The transfer of data between the memory buffers and the storage circuits over data buses 25 is controlled by local processor 28 and other control circuitry not forming a part of control logic 30 of the present invention.

Local processor 28 also controls the overall process by which data is transferred between interface circuit 16 and memory buffers 0-N. The data is transferred as a series of data segments, typically of equal length. The size of the segments is defined by local processor 28 and may, for example, equal the size of a sector on each of the memory storage units 0-N. Each segment is transferred between interface circuit 16 and a memory buffer 24 as a unit.

Bus extension 32 couples local processor 28 to control registers in memory buffer 24, including a read/write register. Bus extension 32 also couples the local processor to address registers in memory buffers 0-N and a holding register circuit 63 in control logic 30. Holding register circuit 63 is used to store a value equal to the number of data words or bytes in each segment of data to be transferred between interface circuit 16 and a memory buffer.

A transfer (or word) counter circuit 65 is coupled to the output of holding register circuit 63. Transfer counter 65 is a down counter and is loaded with the word count stored in holding register circuit 63 each time a new data segment is to be transferred to or from a memory buffer. Transfer counter 65 is decremented once for each data word or byte transferred. When transfer counter 65 reaches 0, a signal is sent to zero detector circuit 68 indicating completion of a segment transfer, and transfer counter 65 is reloaded by holding register 63 in response to a signal from zero detector circuit 68 on line 69. The segment transfer completion signal also causes zero detector circuit 68 to provide read and load signals on lines 71 and 73, respectively, to sequence storage circuit 56.

Sequence storage circuit 56 is a programmable circuit for storing a sequence of memory buffer identifiers used to select the memory buffers to or from which data is to be transferred. The output of sequence storage circuit 56 is coupled to selection bus 33, lines of which are coupled individually to select lines 34A of memory buffers 0-N. Preferably, sequence storage circuit 56 is implemented using conventional first-in/first-out (FIFO) circuits to form a storage matrix in which memory buffer identifiers stored in the circuit are accessed in the same sequence that they are loaded, although the access sequence may also be in any other repetitive order depending on the implementation and the application (e.g., the identifiers can be accessed in a reverse order). Sequence storage circuit 56 can also be implemented using RAM or register arrays, or a microprocessor, but a FIFO implementation requires the least amount of hardware.

Figure 4:
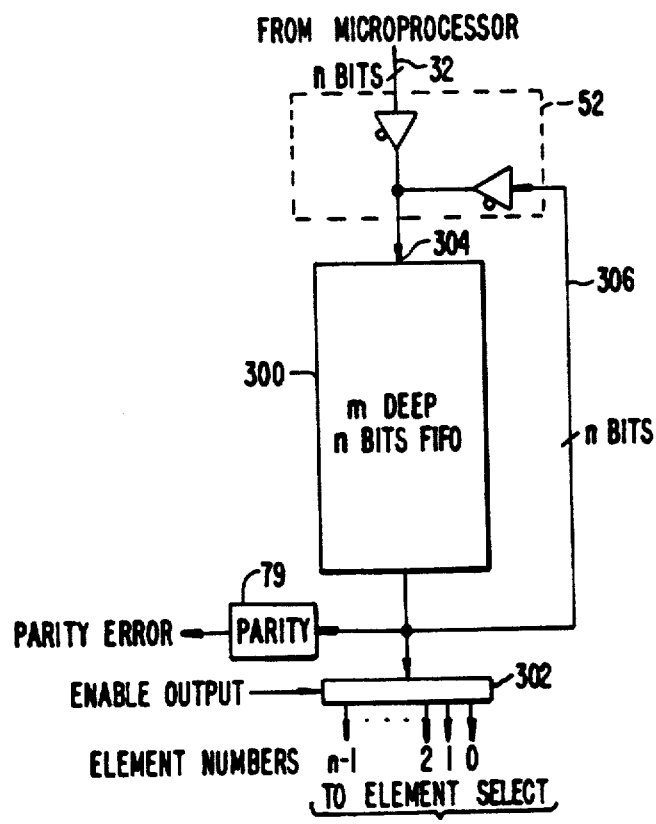
FIG. 4 is a block diagram of one implementation of the memory buffer selection FIFO circuitry of FIG. 3.

The exact manner in which identifiers are accessed from sequence storage circuit 56 depends on the particular implementation of the circuit. Accessing an identifier from sequence storage circuit 56 can be accomplished in numerous ways. For example, it may be the case that a FIFO circuit is used that automatically transfers the first identifier with which it is loaded to its output and latches the output, such that the first identifier is immediately available on selection bus 33, and subsequently loaded identifiers are accessed by providing a read signal to the FIFO circuit. This implementation is exemplified in FIG. 3. The FIFO circuit may also require an additional output enable signal, as shown in FIG. 4. "Accessing" sequence storage circuit implementations other than FIFO circuitry may include operations such as "fetch", "unload" and "non-destructive read".

The output of sequence storage circuit 56 is also coupled by bus 33 to one input of a 2:1 multiplexer circuit 52, the other input of which is coupled to bus extension 32. At the beginning of a data transfer, local processor 28 provides a signal on load data line 75 which causes multiplexer circuit 52 to couple bus extension 32 to the data input of sequence storage circuit 56 in order to load memory buffer identifiers into sequence storage circuit 56. After the identifiers are loaded local processor 28 releases control of multiplexer 52, and multiplexer 52 couples the output of sequence storage circuit 56 to its input. Multiplexer 52 allows the output of sequence storage circuit 56 to be written back to its input each time an identifier stored in sequence storage circuit 56 is accessed. In this manner the sequence of identifiers stored in sequence storage circuit 56 can be repeated as necessary to complete the transfer of data. When the transfer is completed, or at the initiation of a subsequent transfer, the local processor 28 causes a reset control logic circuit 77 to clear sequence storage circuit 56.

A parity circuit (or other validation circuitry) 79 coupled to bus 33 validates the identifiers written back into sequence storage circuit 56. Each identifier stored by local processor 28 in sequence storage circuit 56 includes one or more parity bits. When an identifier is accessed from sequence storage circuit 56, parity circuit 79 generates a corresponding parity value and compares it to the parity bit or bits appended to the identifier. Parity circuit 79 generates an error signal if the compared parity data do not match. In addition, bus 33 is coupled between the output of sequence storage circuit 56 and bus extension 32 to allow local processor 28 to read back identifiers stored in sequence storage circuit 56 for validation and diagnostic purposes. Bus 35 couples the output of holding register circuit 63 to bus extension 32 to allow local processor 28 to read the contents of holding register circuit 63 for similar purposes.

An exemplary implementation of sequence storage circuit 56 using an n x m FIFO circuit 300 is shown in FIG. 4, where n represents the bit length of the storage matrix (i.e., the number of bits in each memory buffer identifier storage location), and m represents the depth of the storage matrix (i.e., the number of identifier storage locations). FIFO circuit 300 can be constructed from any number of conventional FIFO circuit chips to create a matrix of the desired size. If it is desired that a group of memory buffers from an array of memory buffers be selectable at one time during a sequenced data transfer, the FIFO circuit can be implemented in a bit-significant format where each bit of an identifier storage location in the FIFO circuit corresponds to a different memory buffer. In this format the identifiers stored in the FIFO circuit directly represent, as a pattern of ones and zeros, the selecting signals for each memory buffer of the array, and the bit-length of the FIFO circuit at least equals the number of memory buffers in the memory buffer array. The bit-length may be greater than the array size if parity bits are appended to the stored identifiers.

If on the other hand only a single memory buffer is to be selected during each step of the sequenced data transfer, the bit-length of the FIFO circuit can be made less than the size of the memory buffer array by encoding the memory buffer identifiers stored in the FIFO, and decoding the identifiers into bit-significant patterns as the identifiers are read from the FIFO circuit. This storage format is shown in FIG. 5.

Returning to FIG. 4, FIFO circuit 300 receives a sequence of memory buffer identifiers from bus extension 32 through multiplexer 52. The output of FIFO circuit 300 is coupled through an enabled output circuit 302 to selection bus 33 and is written back to the input 304 of FIFO circuit 300 by bus 306 to permit the accessed identifier of the sequence to be repeated. Parity checker circuit 79 generates a parity error signal if the parity does not match the parity of the stored identifier.

Data transfers over data bus 20 between interface circuit 16 and memory buffers 0-N generally take place as follows. Data is transferred over data bus 20 one word at a time. To write data to a selected memory buffer, an external CPU or other source places a data word on data bus 20 and asserts a data request signal on data request line 41, which provides the data request signal to direct memory access (DMA) control circuit 61. DMA control circuit 61 generates a write pulse on line 39, which in combination with the memory buffer select signal allows a data word to be written to the memory buffer or buffers selected by control logic 30. DMA control circuit 61 asserts a data acknowledge signal on line 49. This data acknowledge signal informs the external CPU to assert another data request signal for the next word to be transferred. The data acknowledge signal also is coupled to word counter circuit 65, which decrements its value once for every data acknowledge signal it receives.

To conduct a data read (i.e., a transfer of data from memory buffers 0-N to interface adaptor 16), the external CPU again asserts a data request signal on line 41. In response to the data request signal DMA control circuit 61 generates a read pulse on line 39. In response to the read pulse a selected memory buffer places a data word on data bus 20. DMA control circuit 61 sends a data acknowledge signal on line 49. Word counter 65 is decremented once for each asserted data acknowledge signal. These write and read operations are repeated as often as necessary to complete the data transfer.

Memory buffers are selected by sequence control logic 30 as follows. For purposes of illustration, it is assumed that the following memory buffer sequence is loaded in first in, first out order in sequence storage circuit 56: memory buffer 0, memory buffer 5, memory buffer 10 and memory buffer 12. The first identifier in sequence storage circuit 56, when accessed, causes memory buffer 0 to be selected. The first identifier is also written back to the input of sequence storage circuit 56 before a second identifier is accessed. When interface circuit 16 asserts a data request on line 41 to transfer a data word to memory buffer 0, the first data word placed on data bus 20 is read by memory buffer 0, and word counter 65 is decremented by 1. In response to a second data request signal, a second data word is read by memory buffer 0, and word counter 65 is again decremented by 1. This continues until word counter 65 reaches 0.

When word counter 65 reaches 0, zero detector circuit 68 is activated to provide various control signals as follows: control signals are provided on lines 71 and 73 to sequence storage circuit 56 to cause the second identifier to be accessed for selecting memory buffer 5, and to cause the second identifier to be written back to the input of sequence storage circuit 56; and a control signal is provided to load word counter circuit 65 from holding register circuit 63.

After the data segment is transferred to memory buffer 5, the process is repeated to transfer data to memory buffers 10 and 12. When the transfer to memory buffer 12 is complete, memory buffer 0 will again be selected and the sequence repeated to transfer additional data to each of the selected memory buffers. This process will continue until the data transfer from the interface circuit 16 is completed. After a desired amount of data has been transferred to memory buffers 0, 5, 10 and 12, a data transfer will begin from memory buffers 0, 5, 10 and 12 to their corresponding data bus 25 to complete the data transfer to storage units 26.

FIGS. 5(a)-(f) show an example of the steps by which a typical FIFO circuit 400 selects a repeating sequence of memory buffers. The FIFO is configured to select a sequence of 5 memory buffers in single order from an array of 16 buffers. The sequence in the order is 0, 5, 8, 14 and 2. The FIFO is implemented as 16 addresses deep (although only 5 are necessary for this example) by 4 bits wide. The addresses are encoded and a 4-to-16 decoder circuit 402 is used to select one buffer at a time. In FIGS. 5(a)-(f) a solid line signal path indicates that the signal path is active; a dotted line signal path indicates that the path is inactive.

Figure 5A:
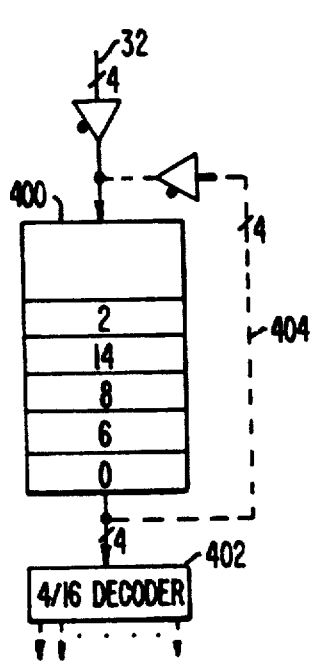
FIGS. 5(a)-5(f) illustrate the memory buffer selection process of the present invention using a 4-bit wide, 16-element FIFO storage circuit having decoded outputs for serially sequencing 5 of 16 elements.

In FIG. 5(a), bus extension 32 is shown activated (solid line) to load FIFO circuit 400 with addresses of the selected buffers in sequence. In this figure buffers 0, 5, 8, 14 and 2 are loaded in first-in/first-out order. Buffer 0 is loaded first. The decoder 402 output is either not enabled or is ignored at this time.

Figure 5B:
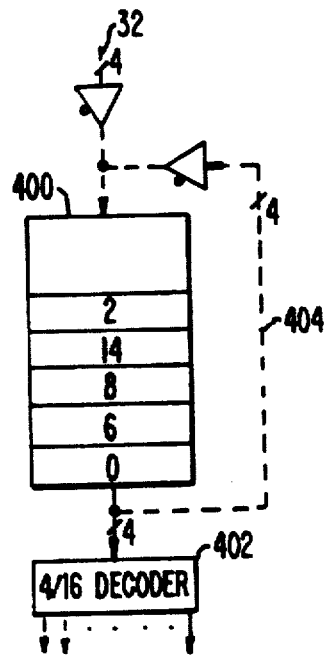

FIG. 5(b) shows the FIFO circuit 400 during data transfer with buffer 0 selected. Bus extension 32 is inactive (dotted line) during this time, as is feedback 404.

Figure 5C:
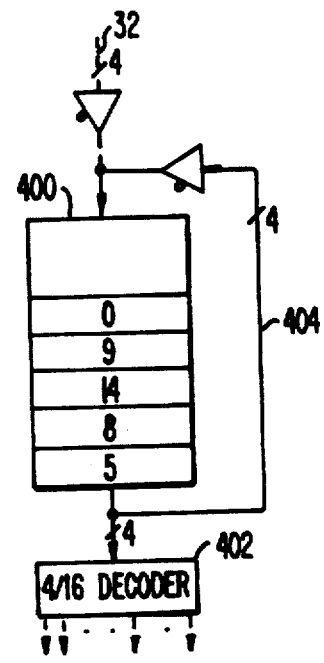

FIG. 5(c) shows the end of data transfer to buffer 0. The address of buffer 0 is written back into the FIFO circuit 400 after the FIFO circuit is accessed via writeback path 404, and there is a shift of the FIFO contents to put 5 at the output.

Figure 5D:
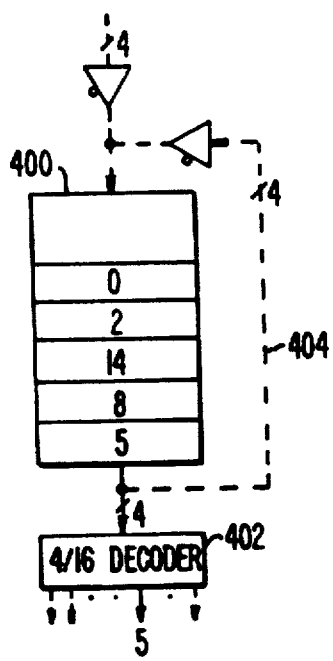

FIG. 5(d) shows FIFO circuit 400 during data transfer with buffer 5 selected. The write-back path 404 is inactive.

Figure 5E:
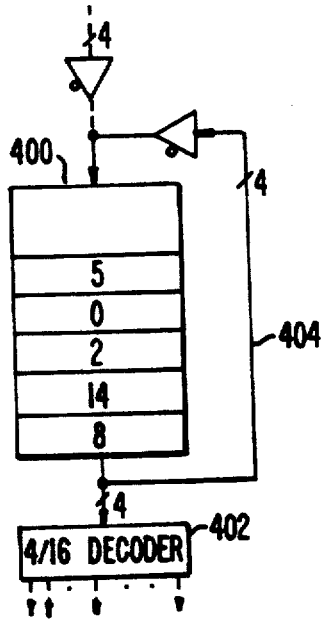

FIG. 5(e) shows the end of data transfer to buffer 5. The address of buffer 5 is written back into FIFO circuit 400 after the FIFO circuit is accessed via writeback path 404, and another FIFO shift is done.

Figure 5F:
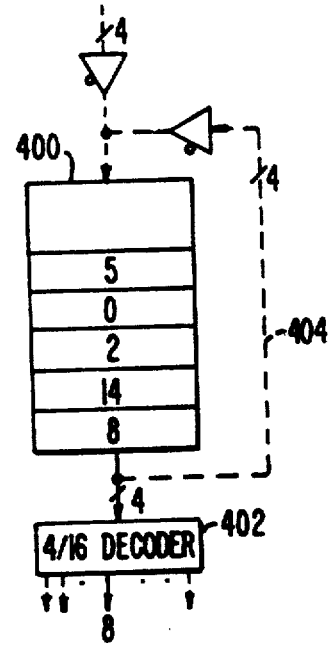

FIG. 5(f) shows FIFO circuit 400 during data transfer with buffer 8 selected. Write-back 404 is again inactive.

Buffers 14 and 2 are accessed in the same way as the previous buffers. These accesses are not shown in FIG. 5. This sequence will be repeated until the data transfer for all buffers is completed as discussed previously.

Figure 6:
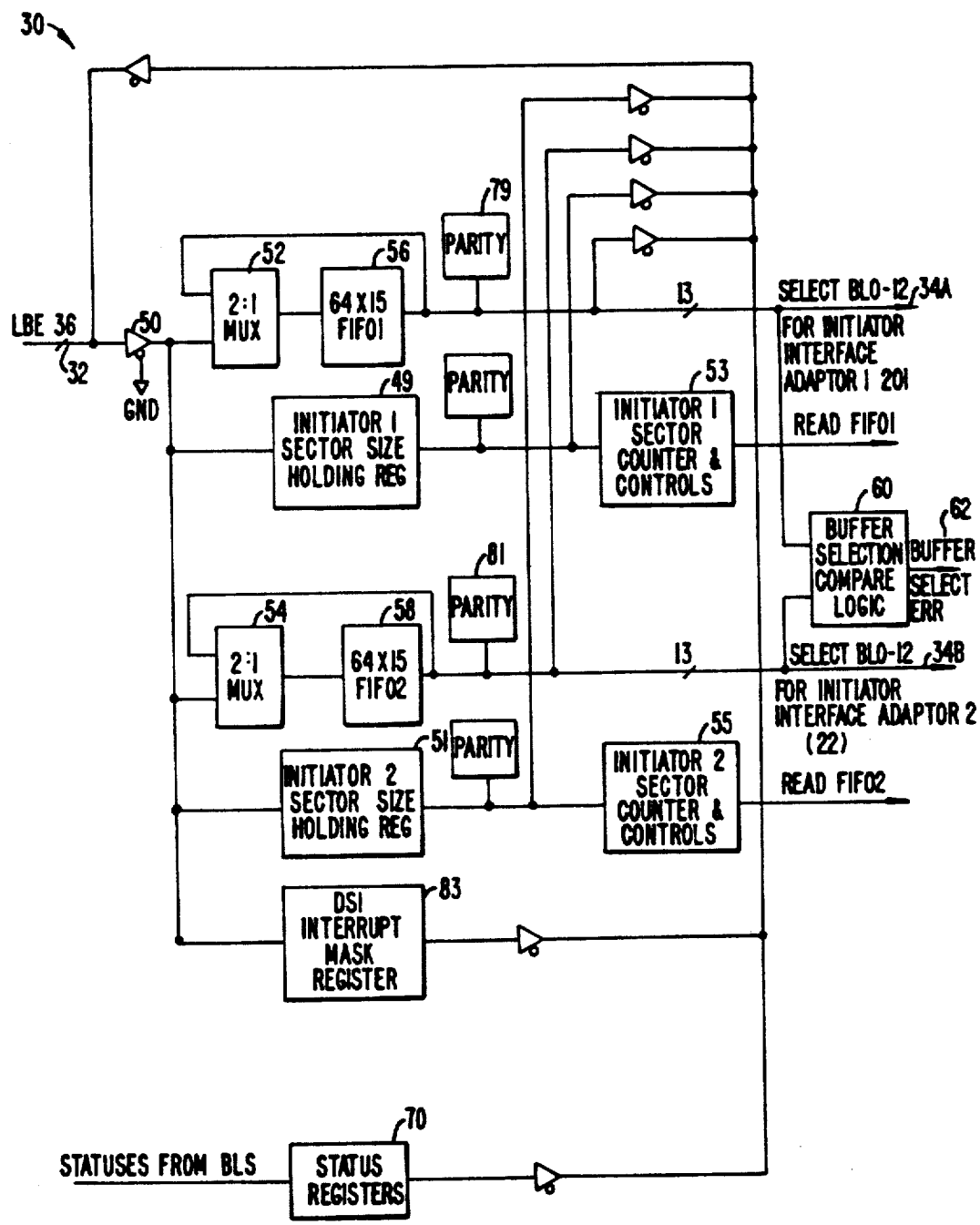
FIG. 6 is a block diagram of a second embodiment of the data path control logic according to FIG. 1 using two FIFO circuits.

FIG. 6 shows in block diagram a further implementation of the control logic 30 found in FIG. 1 and FIG. 3. This implementation includes a second set of sequence storage circuits, holding register circuits, and transfer counters and controls, as well as a buffer compare logic 60, whose function is described below. Addresses are provided to control logic 30 through bus extension 32. A receiver 50 is connected to bus extension 32. Receiver 50 has its output coupled to a first 2:1 multiplexer 52 and a second 2:1 multiplexer 54. Each multiplexer 52 and 54 is further coupled to a sequence storage circuit 56 and 58, respectively. Preferably, each sequence storage circuit is a first-in/first-out (FIFO) device that provides a 64×15-bit word array. Thirteen bits of each word are used for selecting one or more of select lines BL0-BL12, with the remaining two bits being parity bits. The output of sequence storage circuit 56 corresponds to select lines 34A for selecting any one of memory buffers 24 while data is provided on data bus 20. Similarly, the output of sequence storage circuit 58 corresponds to select lines 34B for selecting any one of memory buffers 24 while data is provided on data bus 22. Buffer compare logic 60 has inputs connected one each to select lines 34A and 34B and an output coupled to local processor 28 by output line 62. When buffer compare logic 60 receives signals from both select lines 34A and 34B for the same buffer 24, this indicates that both data buses 20 and 22 are trying to access the same memory buffer 24 simultaneously. When such occurs, buffer compare logic 60 generates an error signal to local processor 28 on output line 62.

In a general overview of operation, an address pattern is loaded into the 64×15-bit word array of FIFO 56 from bus extension 32. Each word in the address pattern has one or more active bits that, when selected, enables a particular select line 34A coupled to a specific memory buffer 24. The word output from FIFO 56 selects a specific line 34A to access a specific memory buffer 24 with data either written to or read from that memory buffer 24 along data bus 20. In addition, a word output from FIFO 58 selects a specific select line 34B to access a specific memory buffer 24 to read or write data along data bus line 22. The outputs of FIFOs 56 and 58 are coupled back to their inputs through multiplexers 52 and 54, respectively.

Status register 70 is used to provide the local processor with the status of the memory buffer (i.e., interrupt status, mask status and other status, such as FIFO full, etc.). Interrupt mask register 83 is used to mask an interrupt from one or more of the memory buffers. An interrupt is generated upon the completion of a data transfer. The control logic 30 in FIG. 6 is essentially identical in operation to that found in FIG. 3 and includes the second sequence storage circuit with accompanying register, counters and controls. Register 49 and counter and control circuit 53 correspond to the holding register and counter and control circuitry of FIG. 3 for FIFO 56. Register 51 and counter and control circuitry 55 perform the same function for FIFO 58. The buffer compare logic is added to this embodiment in order to detect an error of selecting the same memory buffer for the simultaneous write and read operations as described earlier.

Figure 7:
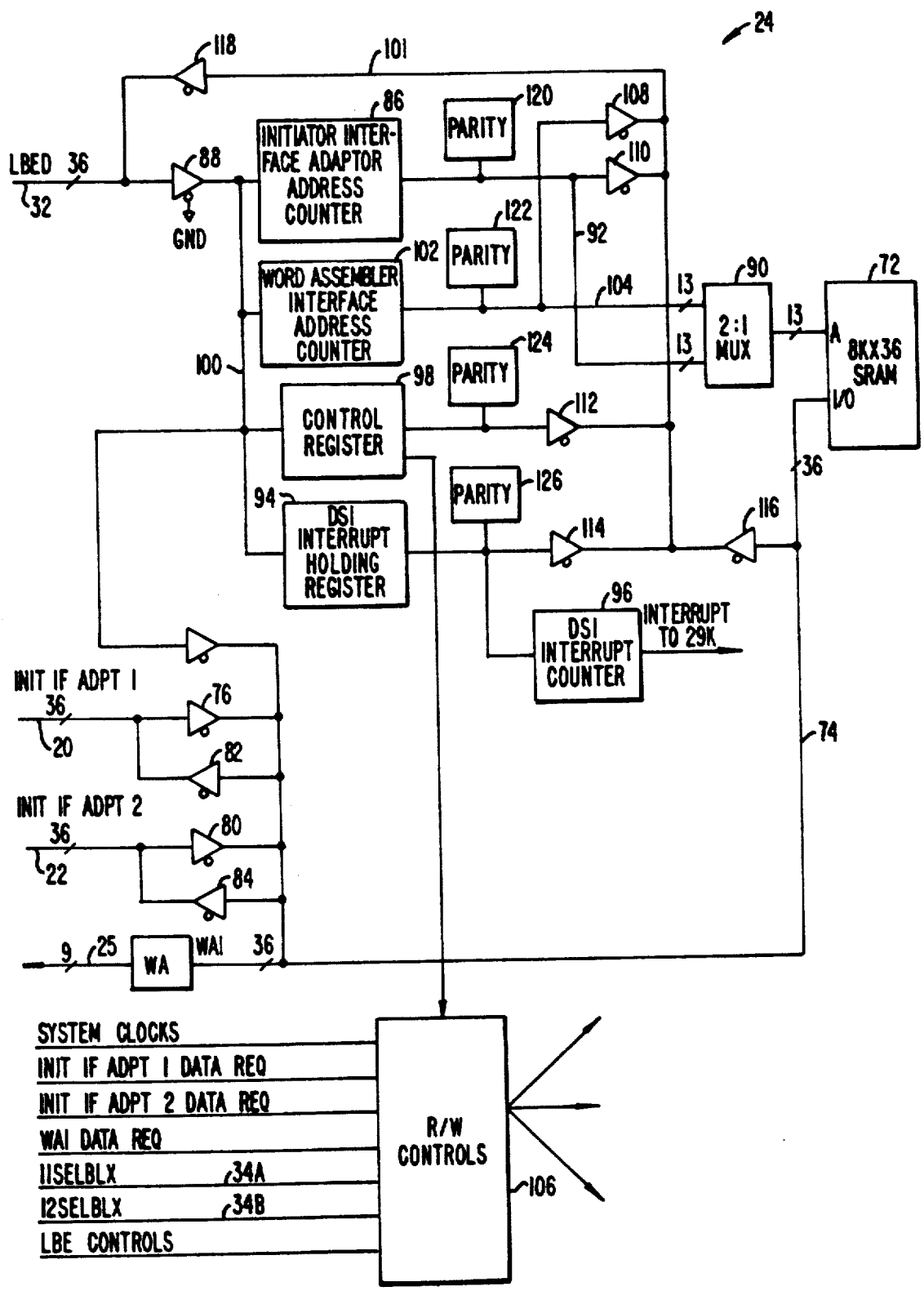
FIG. 7 is a block diagram of the memory buffer of FIG. 1.

FIG. 7 is a block diagram showing one of the memory buffers 24 shown in FIG. 1. Data transferred on 32-bit data bus 20 comes into memory buffer 24 much faster than the data transferred can be provided to storage elements 26 across 9-bit data bus 25; therefore, a temporary buffer storage unit is provided. Memory circuit 72 temporarily stores data going between interface circuits 16 and 18 and storage units 26. The memory circuit 72 serves the function of storing the data from either interface circuit 16 or 18 transferred along 36-bit data bus 20 or 22, respectively, which are subsequently written to or read from storage elements 26 along 9-bit data bus 25.

Receiver 76 and driver 82 are connected in parallel between data bus 20 and an internal bus 74 for data to be written into storage element 26. Receiver 76 is enabled to provide a data path along 36-bit internal bus 74 to memory circuit 72. Subsequently, the data is transferred from memory circuit 72 along internal bus 74 to storage unit 26 through a word assembler 78. Word assembler 78 accepts the data coming on internal bus 74 and separates the data into manageable 9-bit bytes going to storage unit 26 on 9-bit data bus 25. The 36-bit internal bus 74 allows four bytes, each with 9-bits, to be received in parallel at word assembler 78. Each of the four bytes is then serially transferred into storage unit 26. Additional receiver 80 and driver 84 are connected in parallel between data bus 22 and internal bus 74. When receiver 80 is enabled, data transferred on data bus 22 first goes to memory circuit 72. The data is then transferred to storage units 26 via word assembler 78 in the same manner as described for data bus 20 above.

To read data from memory element 26, the desired four 9-bit bytes are retrieved and then transferred along data bus 25 to word assembler 78. Word assembler 78 reassembles the bytes into the original 36-bit word. The word is then transferred as four bytes in parallel along internal bus 74 back to memory circuit 72. Subsequently, for data being read through data bus 20, driver 82 is enabled while receiver 76 is disabled. The data then flows from memory circuit 72, along internal bus 74 and through driver 82, then along data bus 20 to interface circuit 16, then back to the external computer. When data is transferred in a read cycle along data path 22, driver 84 is enabled while receiver 80 is disabled and the cycle proceeds the same as described for data path 20 above. So, when data bus 20 is used during either a write or read cycle, both receiver 80 and driver 84 are disabled, and when data bus 22 is used during either a write or read cycle, both receiver 76 and driver 82 are disabled.

The local bus extension 32 is coupled to memory buffer 24 through a receiver 88. When data is to be transferred along data bus 20 or 22, the starting address in memory circuit 72 is stored in an address counter 86. This is accomplished by providing the address along local bus extension 32 by enabling receiver 88 and the input of counter 86. This starting address proceeds along an address bus 92 coupled between address counter 86 and a multiplexer 90. The output of multiplexer 90 is subsequently coupled to the address input of memory circuit 72. After each read/write cycle, address counter 86 is incremented sequentially to provide the next address in memory circuit 72. This sequencing of numbers continues until all the desired address locations are provided. For example, when one hundred words of data are desired to be transferred, one hundred sequences are cycled to provide those address locations. This cycling operation works for both writing into or reading out of the address locations.

When a desired number of address locations are to be accessed, that number (or a subset of that number) can be sent to a holding register 94. The value stored in holding register 94 is provided to an interrupt counter 96. As each read/write cycle is finished, the number stored in interrupt counter 96 is decremented once for each cycle until zero is reached. Once the interrupt counter 96 is decremented to zero, an interrupt signal is sent to local processor 28. This signal informs local processor 28 that the number of cycles set forth in the holding register have occurred.

Each memory buffer 24 has a control register 98 and a word assembler address counter 102 connected in parallel with address counter 86 and a holding register 94. Each of these four devices are accessed by an internal bus 100 and bus 101. The enabling bits on receivers 76 and 80 and drivers 82 and 84 are controlled by R/W control circuit 106. Control circuit 106 generates the appropriate control signals in response to the input lines shown on the left and the control word written in control register 98. Both control register 98 and holding register 94 are written into from local bus extension 32 along internal bus 100 when receiver 88 is enabled. Control signals (not shown) control which of address counter 86, word assembler address counter 102, control register 98 or holding register 94 is accessed when providing a control word on internal bus 100.

When writing to or reading from storage units 26 along internal bus 74 through word assembler 78, word assembler address counter 102 is initialized with a word address in memory circuit 72. The output from word assembler address counter 102 is coupled to multiplexer 90 via internal bus 104. Word assembler address counter 102 then provides the address on internal bus 104 to memory circuit 72 through multiplexer 90. The count of the words is similarly provided by interrupt counter 96 as described before. All the clock signals, read/write signals, and other control signals are provided by control circuit 106. The details of these control signals would be obvious to one skilled in the art. Various additional drivers 108, 110, 112, 114, 116 and 118 are provided to allow local processor 28 to determine the present status of initiator address counter 86, word assembler address counter 102, control register 98, holding register 94, word assembler 78, and memory circuit 72. A plurality of parity circuits 120, 122, 124 and 126 generate parity error signals.

Thus a novel circuit for selecting a variable sequence of elements has been described. One skilled in the art will appreciate that the present invention can be practiced by other than the described embodiments, and in particular may be incorporated in circuits other than the described data storage system, and may be modified for use with other types of electronic systems. The described embodiments are presented for purposes of illustration and not of limitation, and the present invention is limited only by the claims which follow.

What is claimed is:

1. A system for storing data from an external central processing unit, said system comprising:
    a local processor;
    a plurality of storage devices;
    a plurality of memory buffers, each coupled to a separate storage device by a buffer-storage bus;
    a memory data bus coupled between said central processing unit and said buffers for allowing the transfer of said data between said central processing unit and said memory buffers, and with said memory data bus having more bit lines than said buffer-storage bus;
    a local processor data bus coupled to said local processor; and
    a data path control circuit including:
        a first sequencing means, having an input coupled to said local processor data bus and a plurality of outputs each coupled to a separate one of said memory buffers, for selectively enabling one or more of said memory buffers in a first sequenced pattern to allow said data to be selectively written into or read from said memory buffers;
        a second sequencing means, having an input coupled to said local processor data bus and a plurality of outputs each coupled to a separate one of said memory buffers, for selectively enabling one or more of said memory buffers in a second sequenced pattern to allow said data to be selectively written into or read from said memory buffers; and
        means, coupled to said first and second sequencing means, for preventing said first and second sequencing means from accessing an identical one of said memory buffers at a coincident time.

2. The system of claim 1 wherein said data path control circuit is programmed to provide a first selective sequence for said first sequencing means and a second selective sequence for said second sequencing means.

3. The system of claim 1 wherein said data path control circuit is programmed to simultaneously allow said first sequencing means to write to a first group of said memory buffers and said second sequencing means to read from a second group of said memory buffers.

4. The system of claim 1 wherein said data path control circuit allows said first sequencing means to enable writing to or reading from said memory buffers while said second sequencing means is inactive.

5. The system of claim 1 wherein said data path control means is programmed by said local processor.

6. The system of claim 1 wherein said first and second sequencing means are FIFO (first-in-first-out) devices.

7. The system of claim 6 further comprising first and second multiplexers each having a first input coupled to an output of a separate one of said FIFO devices, a second input coupled to said local processor data bus, and an output coupled to an input of a separate one of said FIFO devices.

8. The system of claim 1 wherein said preventing means comprises a logic circuit having first inputs coupled to one of said first sequencing means outputs, second inputs coupled to one of said second sequencing means outputs, and an output coupled to an error input of said local processor for indicating an error when two sequencing means attempt to access an identical one of said memory buffers.

9. The system of claim 1 wherein said sequenced patterns are stored in said first and second sequencing means with each pattern designating from none to all of said memory buffers and storage devices to be accessed.

10. The system of claim 1 wherein said memory data bus comprises first and second memory data buses, said first sequencing means enabling said first memory data bus at said memory buffers, said second sequencing means enabling said second memory data bus at said memory buffers.

11. The system of claim 10 wherein said data path control circuit allows said first sequencing means to enable writing to or reading from a first group of said memory buffers over said first memory data bus simultaneously with said second sequencing means enabling writing to or reading from a second group of said memory buffers over said second memory data bus.

12. The system of claim 11 wherein said first and second sequencing means are FIFO (first-in, first-out) devices.

13. In a system for storing data from an external central processor in a plurality of memory storage devices, a plurality of memory buffer devices being coupled between said central processor and said memory storage devices, each memory buffer comprising:
    a local processor data bus;
    a temporary memory;
    a first memory data bus coupled to said external processor and said temporary memory to transfer data between said external processor and said temporary memory;

a second memory data bus coupled to one of said memory storage devices and said temporary memory to transfer data between said temporary memory and said memory storage devices;

first addressing means, coupled between said local processor data bus and said temporary memory, for providing addresses to said temporary memory when transferring data between said external processor and said temporary memory;

second addressing means, coupled between said local processor data bus and said temporary memory, for providing addresses to said temporary memory when transferring data between said temporary memory and said temporary storage device; and control means, coupled to said local processor data bus, for programming said first and second addressing means and selectively activating one of said first and second memory data buses.

14. The system of claim 10 wherein each of said addressing means further includes means for selectively writing data to or reading from said memory buffers along said first or second memory data bus in a predetermined sequence.

15. The system of claim 13 further comprising an interrupt holding register having an input coupled to said local processor data bus and an output coupled to an input of an interrupt counter, said interrupt counter having an output coupled to said control means, such that said interrupt register can be loaded with an arbitrary count of a number of words to be transferred to or from said temporary memory.

16. The system of claim 10 wherein said first and second addressing means are counters to sequence said addresses into said temporary memory.

17. The system of claim 13 wherein said control means includes means for controlling a direction of a data transfer on said first and second memory data buses.

18. The system of claim 17 wherein said means for controlling a direction comprise a plurality of transceivers.

19. The system of claim 13 further comprising a multiplexer having first and second inputs coupled to outputs of said first and second addressing means, respectively, and an output coupled to an address input of said temporary memory.

20. A system for storing data from an external central processing unit, said system comprising:
a local processor;
a plurality of storage devices;
a plurality of memory buffers, each coupled to a separate storage device by a buffer-storage bus;
a first data bus coupled between said central processing unit and said buffers for allowing the transfer of said data between said central processing unit and said memory buffers, and with said data bus having more bit lines than said buffer-storage bus;
a second data bus coupled to said local processor; and
a data path control circuit including:
a first-in/first-out (FIFO) device, having an input coupled to said second data bus and a plurality of outputs each coupled to a separate one of said memory buffers, for selectively enabling one or more of said memory buffers in a sequenced pattern to allow said data to be selectively written into or read from said memory buffers;
a second FIFO device, having an input coupled to said second data bus and a plurality of outputs each coupled to a separate one of said memory buffers, for selectively enabling one or more of said memory buffers in a sequenced pattern to allow said data to be selectively written into or read from said memory buffers, with said data path control circuit programmed to provide a first selective sequence for said first FIFO device and a second selective sequence for said second FIFO device;
first and second multiplexers each having a first input coupled to an output of a separate one of said FIFO devices, a second input coupled to said second data bus, and an output coupled to an input of a separate one of said FIFO devices; and
a logic circuit having first inputs coupled to one of said first FIFO device outputs, second inputs coupled to one of said second FIFO device outputs, and an output coupled to an input of said local processor for indicating an error when two FIFO devices attempt to access an identical one of said memory buffers.

21. The system of claim 20 further comprising a third data bus coupled between said central processing unit and said memory buffers, wherein said data path control circuit is programmed to simultaneously allow said first sequencing means to control reading from or writing to a first group of said memory buffers over said first data bus and said second sequencing means to control writing to or reading from a second group of said memory buffers over said third data bus.

22. The system of claim 20 further comprising a third data bus coupled between said central processing unit and said memory buffers, wherein said data path control circuit allows said first sequencing means to control writing to or reading from said memory buffers while said second sequencing means is inactive.

23. The system of claim 20 wherein said data path control means is programmed by said local processor.

24. The system of claim 20 wherein each word from said second data bus stored in said first and second sequencing means designates a pattern from none to all of said memory buffers to be addressed.

25. In a system for storing data from an external central processor in a plurality of memory storage devices, a plurality of memory buffer devices being coupled between said central processor and said memory storage devices, each said memory buffer comprising:
a local processor data bus;
a temporary memory;
an interrupt register having an input coupled to said processor data bus;
a first memory data bus coupled to said external processor and said temporary memory to transfer data between said external processor and said temporary memory;
a second memory data bus coupled to one of said memory storage devices and said temporary memory to transfer data between said temporary memory and said memory storage devices;
first addressing means, coupled between said local processor data bus and said temporary memory, for providing addresses to said temporary memory when transferring data between said external central processor and said temporary memory and for selectively writing data to or reading from said memory buffers along said first memory data bus in a predetermined sequence;

second addressing means, coupled between sad local processor data bus and said temporary memory, for providing addresses to said temporary memory when transferring data between said temporary memory and said memory storage device and for selectively writing data to or reading from said memory buffers along said second memory data bus in a predetermined sequence; and control means, coupled to said local processor bus, for programming said first and second addressing means and selectively activating one of said first and second memory data buses and for controlling a direction of a data transfer on said first and second memory data buses;

an interrupt counter having an input coupled to an output of an interrupt register and an output coupled to said control means such that said interrupt register can be loaded with a count of a number of words to be transferred to or from said memory buffers; and a multiplexer having first and second inputs coupled to outputs of said first and second addressing means, respectively, and an output coupled to an address input of said temporary memory.

26. The system of claim 25 wherein said first and second addressing means are counters to sequence said addresses into said temporary memory.

27. The system of claim 25 wherein said control means comprise a plurality of transceivers.

28. A method for storing data in a plurality of memory buffers between a plurality of storage devices and an external central processor, comprising:

storing a first sequencing pattern in a first sequencing means;

selectively enabling one or more of said memory buffers according to said first sequencing pattern to allow said data to be selectively written into or read from said memory buffers;

storing a second sequencing pattern in a second sequencing means;

selectively enabling one or more of said memory buffers according to said second sequencing pattern to allow said data to be selectively written into or read from said memory buffers; and preventing said first and second sequencing means from accessing an identical one of said memory buffers at a coincident time.

29. The system of claim 28 further comprising the steps of simultaneously allowing said first sequencing means to access a first group of said memory buffers and said second sequencing means to access a second group of said memory buffers.

30. The system of claim 28 further comprising the step of accessing said first and second sequencing means in FIFO (first-in-first-out) fashion.

31. The system of claim 28 further comprising the steps of selectively providing one of a data bus and an output of said first sequencing means to an input of said first sequencing means.

* * * * *